United States Patent
Jenewein et al.

(10) Patent No.: US 6,365,071 B1
(45) Date of Patent: *Apr. 2, 2002

(54) SYNERGISTIC FLAME PROTECTION AGENT COMBINATION FOR THERMOPLASTIC POLYMERS

(75) Inventors: Elke Jenewein, Gersthofen; Hans-Jerg Kleiner, Kronberg; Wolfgang Wanzke, Meitingen; Winfried Budzinsky, Bad Soden, all of (DE)

(73) Assignee: Clariant GmbH, Frankfurt (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,031

(22) PCT Filed: Apr. 2, 1997

(86) PCT No.: PCT/EP97/01664

§ 371 Date: Jan. 29, 1999

§ 102(e) Date: Jan. 29, 1999

(87) PCT Pub. No.: WO97/39053

PCT Pub. Date: Oct. 23, 1997

(30) Foreign Application Priority Data

Apr. 12, 1996 (DE) .......................... 196 14 424

(51) Int. Cl.⁷ .......................... C09K 21/04; C08K 5/53
(52) U.S. Cl. .................. 252/609; 252/601; 524/126
(58) Field of Search ................. 252/601, 609; 524/126

(56) References Cited

U.S. PATENT DOCUMENTS

| | | | |
|---|---|---|---|
| 3,397,035 A | 8/1968 | Shen et al. | 524/415 |
| 3,594,347 A | 7/1971 | Lazarus et al. | 524/135 |
| 3,900,444 A | 8/1975 | Racky et al. | 524/126 |
| 4,036,811 A | 7/1977 | Noetzel et al. | |
| 4,049,612 A | 9/1977 | Sandler | 524/133 |
| 4,078,016 A | 3/1978 | Kramer | 524/133 |
| 4,100,089 A | 7/1978 | Cammack et al. | 252/63 |
| 4,180,495 A | 12/1979 | Sandler | 260/45.75 K |
| 4,208,321 A | 6/1980 | Sandler | 260/45.75 K |
| 4,208,322 A | 6/1980 | Sandler | |
| 4,618,633 A | 10/1986 | Taubitz et al. | 524/80 |
| 4,632,946 A * | 12/1986 | Muench et al. | 523/179 |
| 4,853,424 A | 8/1989 | Staendeke et al. | 523/506 |
| 5,102,931 A * | 4/1992 | Fuhr et al. | 524/126 |
| 5,115,005 A | 5/1992 | Hörner | 524/133 |
| 5,164,437 A | 11/1992 | Chakrabarti et al. | 524/400 |
| 5,173,515 A * | 12/1992 | Von Bonin et al. | 521/103 |
| 5,281,637 A * | 1/1994 | Blocker | 524/100 |
| 5,326,805 A | 7/1994 | Sicken et al. | 524/101 |
| 5,773,556 A * | 6/1998 | Kleiner et al. | 528/321 |
| 5,780,534 A * | 7/1998 | Kleiner et al. | 524/133 |
| 5,852,085 A | 12/1998 | Brown et al. | 524/128 |
| 5,891,226 A | 4/1999 | Kleiner et al. | 106/18.18 |
| 5,973,194 A | 10/1999 | Weferling et al. | 562/8 |
| 6,207,736 B1 | 3/2001 | Nass et al. | 524/126 |

FOREIGN PATENT DOCUMENTS

| | | |
|---|---|---|
| AU | 711202 | 11/1997 |
| DE | 24 47 727 | 4/1976 |
| DE | 3728629 A1 | 3/1989 |
| DE | 44 30 932 A1 | 3/1996 |
| DE | 19708726.4 | 9/1998 |
| EP | 0006568 | 1/1980 |
| EP | 0327496 | 9/1989 |
| EP | 0699708 | 3/1996 |
| EP | 0 806 429 A2 | 11/1997 |
| GB | 1 414 998 | 11/1975 |
| GB | 2021598 | 12/1979 |
| JP | 55-94918 | 7/1980 |
| JP | 57-16017 | 1/1982 |
| JP | 5-245838 | 9/1993 |
| PL | 159350 | 9/1990 |
| PL | 161333 | 6/1991 |
| WO | WO 97/01664 | 1/1997 |
| WO | WO 97/39053 | 10/1997 |
| WO | WO 98/03515 | 1/1998 |
| WO | WO 98/39381 | 9/1998 |

OTHER PUBLICATIONS

Staufer, G., Sperl, M., Begemann, M. Weiden, Buhl, D., Düll–Mühlenbach, I., Ludwigshafen Brandschutz Kunststoffe 85 (1995) 4, pp. 533, 534, 536, 538, No Translation.
Derwent Patent Family and/or Abstract.
Patent Abstract of Japan—Publication No. 05339417.
Patent Abstract of Japan—Publication No. 05086254.
XP002085231 & JP 05 051511 A (Asashi Chem Ind Co Ltd) Mar. 2, 1993.
STN Easy Abstract for EP 0 806 429.
Derwent Patent Family Report and/or Abstracts.
ACS Abstract for PL 159350.
Ullman's Encyclopedia of Industrial Chemistry, ed. Barbara Elvers, vol. 21 A, Chapter 'Polyesters' VCH, Weinheim-–Basle–Cambridge–New York, 1992, pp. 227–251.

* cited by examiner

*Primary Examiner*—Jill Warden
*Assistant Examiner*—Latoya Cross
(74) *Attorney, Agent, or Firm*—Susan S. Jackson; Scott E. Hanf

(57) ABSTRACT

The present invention relates to a synergistic flame retardant combination for thermoplastic polymers, preferably engineering plastics, especially for polyesters, which as component A comprises a phosphinic salt of the formula (I) defined in the description and/or a diphosphinic salt of the formula (II) and/or polymers thereof, and as component B comprises a nitrogen compound of the formula (III) to (VIII) defined in the description, or a mixture of the compounds represented by the formulae.

13 Claims, No Drawings

SYNERGISTIC FLAME PROTECTION AGENT COMBINATION FOR THERMOPLASTIC POLYMERS

This Application is a 371 of PCT/EP97/01664 filed Apr. 2, 1997 and claiming priority to German application 19614424 filed Apr. 12, 1996.

BACKGROUND

The invention relates to a synergistic flame retardant combination comprising calcium, aluminum or zinc phosphinates and certain synergistic, nitrogen-containing compounds.

Polymers are frequently made flame-resistant by adding phosphorus-containing or halogen-containing compounds, or mixtures thereof, to these polymers. Mixtures of phosphorus- and nitrogen-containing compounds are often also used as flame retardants.

Alkali metal salts of phosphinic acids have already been proposed as flame-retarding additives for polyesters (DE-A-2 252 258). They must be incorporated in amounts of up to 30% by weight and in some cases have an unfavorable corrosion-promoting effect on the processing equipment.

In addition, the salts of phosphinic acids with an alkali metal or with a metal from the second or third main group or subgroup of the Periodic Table have been used to produce flame-retardant polyamide molding compositions, especially the zinc salts (DE-A-2 447 727).

Calcium phosphinates and aluminum phosphinates have proven particularly effective in polyesters (EP-A-699 708). However, the preparation of these phosphinates on an industrial scale is relatively complex and expensive, thereby limiting very greatly the possibilities of using the products as flame retardants for plastics.

Combinations of the abovementioned phosphinic salts with the nitrogen bases melamine, dicyandiamide and guanidine have also been proposed as flame retardants for various plastics (EP-A-6 568). In this context, mixtures with defined molar proportions of phosphorus and nitrogen have been found to be particularly effective flame retardants.

However, the abovementioned nitrogen compounds have a very disadvantageous effect on the pattern of properties of the plastics, or are difficult or even impossible to process in certain plastics (e.g. polyester and polyamide). Examples of the disadvantages are poor thermal stability, excessive volatility, strong basicity and lack of compatibility with the plastic.

It has now surprisingly been found that certain nitrogen compounds having higher thermal stability and lower volatility, despite in some cases a lower nitrogen content, than those specified in EP-A-6 568 exhibit a particularly good flameproofing action in combination with calcium phosphinates, aluminum phosphinates and zinc phosphinates, and lend themselves very well to processing with thermoplastics. The mixtures of these nitrogen compounds with the Ca, Al and Zn phosphinates give rise, through a synergistic effect, to markedly more cost-effective flameproofing for thermoplastic polymers, especially for polyesters, than the phosphinates on their own.

SUMMARY

The invention thus provides a synergistic flame retardant combination for thermoplastic polymers, especially for polyesters, which comprises as component A a phosphinic salt of the formula (I) and/or a diphosphinic salt of the formula (II) and/or polymers thereof,

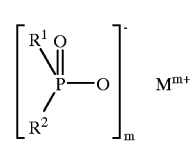

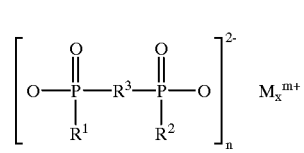

in which $R^1$, $R^2$ are C1–$C_6$-alkyl, preferably $C_1$–$C_4$-alkyl, and are linear or branched, examples being methyl, ethyl, n-propyl, isopropyl, n-butyl, tert-butyl, n-pentyl; or phenyl;

$R^3$ is $C_1$–$C_{10}$-alkylene and is linear or branched, examples being methylene, ethylene, n-propylene, isopropylene, n-butylene, tert-butylene, n-pentylene, n-octylene, n-dodecylene; $C_6$–$C_{10}$-arylene, examples being phenylene, naphthylene; $C_6$–$C_{10}$-alkylarylene, examples being methylphenylene, ethylphenylene, tert-butylphenylene, methylnaphthylene, ethylnaphthylene, tert-butylnaphthylene; $C_6$–$C_{10}$-arylalkylene, examples being phenylmethylene, phenylethylene, phenylpropylene, phenylbutylene;

M is calcium ions, aluminum ions, zinc ions, preferably aluminum ions;

m 2 or 3;

n 1 or 3;

x 1 or 2 and comprises as component B a nitrogen compound of the formula (III) to (VIII) or a mixture of the compounds designated by the formulae,

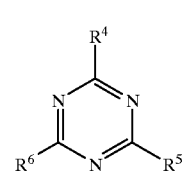

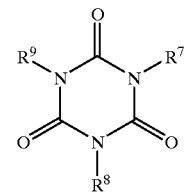

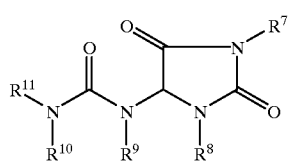

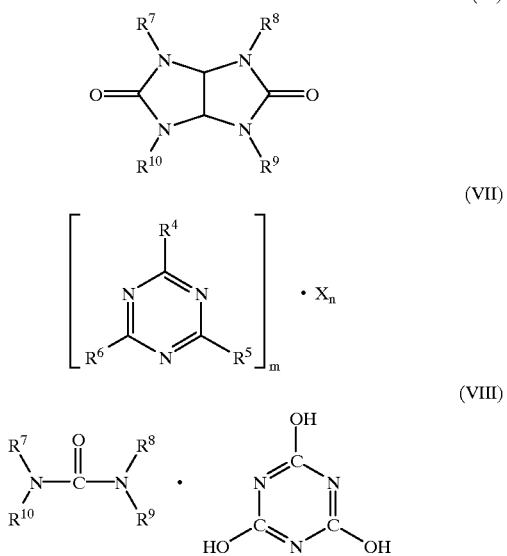

in which $R^4$, $R^5$ and $R^6$ can be defined as follows: hydrogen, $C_1$–$C_8$-alkyl, $C_5$–$C_{16}$-cycloalkyl or -alkylcycloalkyl, possibly substituted by a hydroxyl or a $C_1$–$C_4$-hydroxyalkyl function, $C_2$–$C_8$-alkenyl, $C_1$–$C_8$-alkoxy, -acyl, -acyloxy, $C_6$–$C_{12}$-aryl and also —O—$R^4$ and —N($R^4$)$R^5$ (with the exception of melamine, $R^4$ to $R^6$=H) or are N-alicyclic or N-aromatic, where N-alicyclic denotes cyclic N compounds such as pyrrolidine, piperidine, imidazolidine, piperazine, etc., and N-aromatic denotes heteroaromatic ring compounds such as pyrrole, pyridine, imidazole, pyrazine, etc.

$R^7$, $R^8$, $R^9$, $R^{10}$ and $R^{11}$ are the same groups as $R^4$ to $R^6$, with the exception of the substituents —N($R^4$)$R^5$, N-alicyclic and N-aromatic.

DETAILED DESCRIPTION

In the text below the term "phosphinic salt" denotes salts of phosphinic and diphosphinic acids and polymers thereof.

The phosphinic salts, which are prepared in aqueous medium, are essentially monomeric compounds. Depending on the reaction conditions, polymeric phosphinic salts may also be formed.

Examples of suitable phosphinic acids as a constituent of the phosphinic salts are:

dimethylphosphinic acid, ethylmethylphosphinic acid, diethylphosphinic acid, methyl-n-propylphosphinic acid, methanedi(methylphosphinic acid), benzene-1,4-(dimethylphosphinic acid), methylphenylphosphinic acid and diphenylphosphinic acid.

The salts of the phosphinic acids of the invention can be prepared by known methods that are described in more detail in EP-A-699 708. In such methods, the phosphinic acids are reacted in aqueous solution with metal carbonates, metal hydroxides or metal oxides.

Polymers in the context of the invention are:

1. Polymers of mono- and diolefins, for example polypropylene, polyisobutylene, polybutylene, poly-1-butene, polyisoprene or polybutadiene and also polymers of cycloolefins such as, for example, of cyclopentene or norbornene; and also polyethylene (which may be crosslinked); for example high-density polyethylene (HDPE), polyethylene of high density and high molar mass (HDPE-HMW), polyethylene of high density and ultra high molar mass (HDPE-UHMW), medium-density polyethylene (MDPE), low-density polyethylene (LDPE), linear low density polyethylene (LLDPE), branched low-density polyethylene (BLDPE).

2. Mixtures of the polymers set out under 1), for example mixtures of polypropylene with polyisobutylene, polypropylene with polyethylene (e.g. PP/HDPE, PP/LDPE) and mixtures of different types of polyethylene (e.g. LDPE/HDPE).

3. Copolymers of monoolefins and diolefins with one another or with other vinyl monomers, for example ethylene-propylene copolymers, linear low-density polyethylene (LLDPE) and mixtures thereof with low-density polyethylene (LDPE), propylene-1-butene copolymers, propyleneisobutylene copolymers, ethylene-1-butene copolymers, etc. Additionally, ethylene-alkyl acrylate copolymers, ethylylene-vinyl acetate copolymers and copolymers thereof with carbon monoxide, or ethylene-acrylic acid copolymers and salts thereof (ionomers), and also terpolymers of ethylene with propylene and a diene, such as hexadiene, dicyclopentadiene or ethylidenenorbornene; and also mixtures of such copolymers with one another and with polymers set out under 1), for example polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene-carbon monoxide copolymers and mixtures thereof with other polymers such as, for example, polyamides.

4. Polystyrene, poly(p-methylstyrene), poly-(α;-methylstyrene).

5. Copolymers of styrene or α-methylstyrene with dienes or acrylic derivatives, for example styrene-butadiene, styrene-acrylonitrile, styrene-alkyl methacrylate, styrene-butadiene alkyl acrylate and methacrylate, styrene-maleic anhydride, styrene-acrylonitrile-methacrylate; mixtures of high impact strength comprising styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

6. Graft copolymers of styrene or α-methylstyrene, for example styrene on polybutadiene, styrene on polybutadiene-styrene or polybutadiene-acrylonitrile copolymers, styrene and acrylonitrile (and/or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates and/or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, and mixtures thereof with the copolymers set out under 5), as are known, for example, as ABS, MBS, ASA or AES polymers.

7. Halogen-containing polymers, for example polychloroprene, chlorinated rubber, chlorinated and brominated isobutylene-isoprene copolymer (halobutyl rubber), chlorinated or chlorosulfonated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; and also copolymers thereof, such as vinyl chloride-vinylidene chloride, vinyl chloride-vinyl acetate or vinylidene chloride-vinyl acetate.

8. Polymers derived from α,β-unsaturated acids and their derivatives, such as polyacrylates and polymethacrylates, and impact-modified (using butyl acrylate) polymethyl methacrylates, polyacrylamides and polyacrylonitriles.

9. Copolymers of the monomers set out under 8) with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

10. Polymers derived from unsaturated alcohols and amines and/or their acyl derivatives or acetals, such as polyvinyl alcohol, polyvinyl acetate, stearate, benzoate and maleate, polyvinylbutyral, polyallyl phthalate, polyallylmelamine; and copolymers thereof with olefins mentioned in section 1.

11. Polyacetals, such as polyoxymethylene, and those polyoxymethylenes comprising comonomers such as, for example, ethylene oxide; polyacetals which are modified with thermoplastic polyurethanes, acrylates or MBS.

12. Polyphenylene oxides and sulfides and mixtures thereof with styrene polymers or polyamides.

13. Polyamides and copolyamides derived from diamines and dicarboxylic acids and/or amino carboxylic acids or the corresponding lactams, such as polyamide 4, polyamide 6, polyamide 6/6, 6/10, 6/9, 6/12, 4/6, 12/12, polyamide 11, polyamide 12, aromatic polyamides prepared starting from m-xylene, diamine and adipic acid; polyamides prepared from 30 hexamethylenediamine and from iso- and/or terephthalic acid, with or without an elastomer as modifier, for example poly-2,4,4-trimethyl-hexamethyleneterephthalamide or poly-m-phenyleneisophthalamide; block copolymers of the above-mentioned polyamides with polyolefins, olefin copolymers, ionomers, or chemically bonded or grafted elastomers; or with polyethers, for example with polyethylene glycol, polypropylene glycol or polytetramethylene glycol. Additionally, copolyamides or polyamides modified with EPDM or ABS; and polyamides which are condensed in the course of processing (RIM polyamide systems).

14. Polyureas, polyimides, polyamideimides, polyetherimides, polyesterimides, polyhydantoins and polybenzimidazoles.

15. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and also block polyether esters derived from polyethers having hydroxyl end groups; additionally, polyesters modified with polycarbonates or MBS.

16. Polycarbonates and polyester carbonates.

17. Polysulfones, polyether sulfones and polyether ketones.

18. Mixtures (polyblends) of the abovementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PU, PC/thermoplastic PU, POM/acrylate, POM/MBS, PPO/HIPS, PPO/PA 6.6 and copolymers.

The amount of phosphinic salt of the formula I or of diphosphinic salt of the formula II to be added to the polymers can be varied within wide limits. In general the amount is from 1 to 30% by weight, based on the finished polymer compound. The optimum amount depends on the nature of the polymer, on the nature of component B and on the type of phosphinic salt itself that is employed, and can readily be determined by experiment. Preference is given to from 3 to 20% by weight, in particular from 5 to 15% by weight.

The phosphinic salts of the invention can be employed in different physical forms depending on the nature of the polymers used and on the desired properties. Thus in order to obtain a better dispersion in the polymer, for example, the phosphinic salts can be ground into a finely divided form. If desired, it is also possible to employ mixtures of different phosphinic salts.

The phosphinic salts of the invention are thermally stable, and neither decompose the copolymers in the course of processing nor influence the process of producing the polymer molding compound. The phosphinic salts are not volatile under preparation and processing conditions for polymers.

As component B the synergistic flame retardant combination comprises a nitrogen compound of the formula (III) to (VIII) or a mixture of the compounds designated by the formulae. Formula (VII) denotes adducts of the triazine compounds (III) (including melamine) with appropriate acids, where m and n can each be 1 or 2.

Examples of such compounds are melamine cyanurate, melamine phosphate, melamine pyrophosphate, melamine diborate, etc.

As component B it is likewise possible to employ oligomeric esters of tris(hydroxyethyl) isocyanurate with aromatic polycarboxylic acids, as are described in EP-A-584 567.

Preferred nitrogen compounds within the context of the invention are benzoguanamine (formula III, $R^4$ =phenyl, $R^5=R^6$=—$NH_2$), tris(hydroxyethyl) isocyanurate (formula IV, $R^7=R^8=R^9$=—$CH_2$—$CH_2$—OH), allantoin (formula V, $R^7=R^8=R^9=R^{10}=R^{11}$=H), glycoluril (formula VI, $R^7=R^8=R^9=R^{10}$=H) and also melamine cyanurate, melamine phosphate, dimelamine phosphate and melamine pyrophosphate (all of the type of formula VII) and urea cyanurate (of the type of formula VIII).

The nitrogen compounds employed as component B are prepared, in some cases industrially, in accordance with known processes.

The amount of nitrogen compound (component B) to be added to the polymers can be varied within wide limits. In general an amount of from 1 to 30% by weight is used, based on the finished polymer compound. The optimum amount depends on the nature of the polymer, on the nature of the phosphinate employed (component A) and on the type of nitrogen compound itself, and can readily be determined by experiment. Preference is given to from 3 to 20% by weight, in particular from 5 to 15% by weight.

Preferred thermoplastic polymers are engineering plastics, for example polystyrene-HI (with increased impact strength, see polymers under Section 5), polyphenylene ethers, polyamides, polyesters, polycarbonates and blends or polyblends such as ABS or PC/ABS.

Particularly preferred polymers for the use of the novel synergistic flame retardant combination are polyesters. These are polymers whose polymer chain comprises repeating units connected via an ester group. Particularly suitable polyesters are described, for example, in "Ullmann's encyclopedia of industrial chemistry, ed. Barbara Elvers, Vol. 21 A, Chapter 'Polyesters' (pp. 227–251), VCH, Weinheim-Basle-Cambridge-New York 1992", which is expressly included by reference.

The flame-retarding components A and B can be incorporated into polymer molding compounds by, for example, premixing all of the constituents, as powders and/or granules, in a mixer and then homogenizing the mixture, in the polymer melt, in a compounder (for example a twin-screw extruder). The melt is commonly drawn off as a strand, cooled and granulated. Components A and B can also be separately introduced directly into the compounder by way of a metering system.

It is likewise possible to admix the flame-retarding additives A and B to finished polymer granules and to process the mixture directly, on an injection molding machine, to form moldings.

In the case of polyesters, for example, the flame-retarding additives A and B can also be added to the polyester mass in the course of polycondensation.

In addition to the flame-retarding components A and B, the molding compounds may also have added to them fillers and reinforcing agents such as glass fibers, glass spheres or minerals such as chalk. In addition, the molding compounds may include other additives such as antioxidants, light stabilizers, lubricants, colorants, nucleating agents or antistats. Examples of the additives that can be used are indicated in EP-A-584 567.

The flame-retardant polymer compositions, especially the polyester molding compounds, are suitable for producing moldings, films, filaments and fibers, for example by injection molding, extrusion or compression.

EXAMPLES

1. Components Employed

Commercial polymers (granules):
  Polybutylene terephthalate (PBT-GR): Celanex 2300 GV1/30 (from Hoechst Celanese, USA) contains 30% glass fibers.
    (PBT): Celanex 2500 (from Hoechst Celanese, USA) contains no fillers or reinforcing agents.
  Polyethylene terephthalate (PET-GR): Impet 2600 GV1/30 (from Hoechst AG, D) contains 30% glass fibers.
    (PET): Polyclear T 86 (from Trevira GmbH, D) contains no fillers or reinforcing agents.
  Polyamide 6 (PA 6): Durethan B29 (from Bayer AG, D) contains no fillers or reinforcing agents.
  ABS polymer: Novodur P2X (from Bayer AG, D) contains no fillers or reinforcing agents.
  Polypropylene (PP): Hostalen PPU 1080 (from Hoechst AG, D)

Flameproofing components (powders)
  Aluminum salt of dimethylphosphinic acid, referred to below as DMPAL
  Aluminum salt of methylethylphosphinic acid, referred to below as MEPAL
  Aluminum salt of methylpropylphosphinic acid, referred to below as MPPAL Nitrogen-containing synergists (powders):
  Allantoin (Soc. Francaise Hoechst, F)
  Benzoguanamine (from SKW, D)
  Glycoluril (Soc. Francaise Hoechst, F)
  Urea cyanurate (Chemie Linz, A)
  Melamine cyanurate (from DSM, NL)
  Melamine phosphate (from DSM, NL)
  TPA-THEIC= oligomeric terephthalic ester of tris (hydroxyethyl) isocyanurate (in accordance with EP-A 584 562)

Antioxidants:
  AO 1: Hostanox O 10 (from Hoechst AG, D)
  AO 2: Hostanox PAR 24 (from Hoechst AG, D)

Lubricants:
  GL: Hoechst-Wachs E (from Hoechst AG, D)

2. Preparation, Processing and Testing of Flame-retardant Polymer Molding Compounds The flameproofing components were mixed, in the proportion stated in the tables, with the polymer granules and, where used, additives, and were incorporated in a twin-screw extruder (model Leistritz LSM 30/34) at temperatures from 230 to 260° C. The homogenized polymer extrudate was drawn off, cooled in a water bath and then granulated.

After adequate drying, the molding compounds were processed into test specimens in an injection molding machine (model Toshiba IS 100 EN) at melt temperatures of 240 to 270 ° C. and were tested for flame retardance, and classified, on the basis of the UL 94 test (Underwriter Laboratories). The flammability of the test specimens was assessed by determining the oxygen index (LOI in accordance with ASTM D 2863-77).

Table 1 shows the results of the comparison examples, where phosphinic salts were employed as sole flameproofing components in PBT, PET and in PA 6 and ABS.

The results of the examples in which phosphinic salts were tested in combination with novel nitrogen-containing compounds are listed in Tables 2 to 8. All quantities are in percent by weight and relate to the finished polymer compound including flameproofing additive.

TABLE 1

Comparison examples. Aluminum salts of phosphinic acids as sole flameproofing component in PBT, PET, PA 6 and ABS.

| Polymer | MEPAL [%] | DMPAL [%] | MPPAL [%] | AO 1 [%] | AO 2 [%] | GL [%] | Class according to UL 94 (1.5 mm) | LOI [%] |
|---|---|---|---|---|---|---|---|---|
| PBT-GR | 15 | | | 0.15 | 0.2 | | V1 | 45.5 |
| PBT-GR | 20 | | | 0.15 | 0.2 | | V0* | 49.5 |
| PBT-GR | | 20 | | | | | V0 | 46.0 |

TABLE 1-continued

Comparison examples. Aluminum salts of phosphinic acids as sole flameproofing component in PBT, PET, PA 6 and ABS.

| Polymer | MEPAL [%] | DMPAL [%] | MPPAL [%] | AO 1 [%] | AO 2 [%] | GL [%] | Class according to UL 94 (1.5 mm) | LOI [%] |
|---|---|---|---|---|---|---|---|---|
| PBT-GR | | | 20 | 0.15 | 0.2 | | V0 | 50.0 |
| PBT | 10 | | | | | | V2 | |
| PBT | 15 | | | | | | V0 | |
| PET-GR | 5 | | | 0.15 | 0.2 | | V2 | 30.0 |
| PET-GR | 10 | | | 0.15 | 0.2 | | V0 | 36.5 |
| PET | 5 | | | 0.15 | 0.2 | | V2 | 28.0 |
| PET | 10 | | | 0.15 | 0.2 | | V0 | 41.5 |
| PA 6 | 15 | | | | | 0.5 | V0 | 31.0 |
| ABS | 30 | | | | | | n.c.** | 52.5 |
| PP | 30 | | | | | | n.c.** | |

*Class achieved even with test specimens with a thickness of 0.8 mm.
**n.c. = not classifiable

TABLE 2

Examples: Aluminum salts of phosphinic acids in combination with nitrogen-containing synergists in PBT-GR.

| MEPAL [%] | DMPAL [%] | MPPAL [%] | Synergist | Amount of synergist [%] | AO 1 [%] | AO 2 [%] | Class according to UL 94 (1.5 mm) | LOI [%] |
|---|---|---|---|---|---|---|---|---|
| 15 | | | Allantoin | 10 | 0.15 | 0.2 | V0 | 41.0 |
| 10 | | | Benzoguanamine | 5 | 0.15 | 0.2 | V0 | 41.0 |
| 15 | | | Benzoguanamine | 10 | 0.15 | 0.2 | V0* | |
| 10 | | | Glycoluril | 10 | 0.15 | 0.2 | V0 | 41.5 |
| 10 | | | Ureacyanurate | 5 | 0.15 | 0.2 | V0 | 44.0 |
| 8 | | | Melamine cyanurate | 6 | 0.15 | 0.2 | V1 | 48.0 |
| 10 | | | Melamine cyanurate | 10 | 0.15 | 0.2 | V0* | 49.5 |
| 15 | | | Melamine cyanurate | 10 | 0.15 | 0.2 | V0* | 50.0 |
| | 10 | | Melamine cyanurate | 10 | | | V0 | 44.0 |
| | | 10 | Melamine cyanurate | 10 | 0.15 | 0.2 | V0 | 48.5 |
| 10 | | | Melamine phosphate | 5 | 0.15 | 0.2 | V0 | 33.5 |
| 10 | | | Melamine phosphate | 10 | 0.15 | 0.2 | V0 | 28.0 |
| 5 | | | TPA-THEIC | 15 | 0.15 | 0.2 | V1* | 31.5 |
| 10 | | | TPA-THEIC | 10 | 0.15 | 0.2 | V1 | 41.0 |
| 15 | | | TPA-THEIC | 10 | 0.15 | 0.2 | V0* | 48.5 |

*Class achieved even with test specimens with a thickness of 0.8 mm.

TABLE 3

Examples. MEPAL in combination with nitrogen-containing synergists in PBT.

| MEPAL [%] | Synergist | Amount of synergist [%] | AO 1 [%] | AO 2 [%] | Class according to UL 94 (1.5 mm) | LOI [%] |
|---|---|---|---|---|---|---|
| 8 | Glycoluril | 7 | 0.15 | 0.2 | V0* | 33.5 |
| 5 | Melamine cyanurate | 5 | 0.15 | 0.2 | V2 | 25.0 |
| 8 | Melamine cyanurate | 7 | 0.15 | 0.2 | V0 | 34.0 |
| 8 | TPA-THEIC | 7 | 0.15 | 0.2 | V0 | 36.5 |

*Class achieved even with test specimens with a thickness of 0.8 mm.

TABLE 4

Examples. MEPAL in combination with nitrogen-containing synergists in PET-GR.

| MEPAL [%] | Synergist | Amount of synergist [%] | AO 1 [%] | AO 2 [%] | Class according to UL 94 (1.5 mm) | LOI [%] |
|---|---|---|---|---|---|---|
| 6 | Benzoguanamine | 4 | 0.15 | 0.2 | V2 | 34.0 |
| 6 | Glycoluril | 4 | 0.15 | 0.2 | V2 | 29.0 |
| 6 | Melamine cyanurate | 4 | 0.15 | 0.2 | V0 | 32.5 |
| 6 | Melamine phosphate | 4 | 0.15 | 0.2 | V2 | 35.5 |

TABLE 5

Examples. MEPAL in combination with nitrogen-containing synergists in PET.

| MEPAL [%] | Synergist | Amount of synergist [%] | AO 1 [%] | AO 2 [%] | Class according to UL 94 (1.5 mm) | LOI [%] |
|---|---|---|---|---|---|---|
| 6 | Benzoguanamine | 4 | 0.15 | 0.2 | V2 | 27.5 |
| 6 | Glycoluril | 4 | 0.15 | 0.2 | V2 | 26.5 |
| 6 | Melamine cyanurate | 4 | 0.15 | 0.2 | V2 | 27.0 |

TABLE 6

Examples. MEPAL in combination with nitrogen-containing synergists in PA 6.

| MEPAL [%] | Synergist | Amount of synergist [%] | Class according to UL 94 (1.5 mm) |
|---|---|---|---|
| 8 | Benzoguanamine | 8 | V2 |
| 8 | Melamine cyanurate | 8 | V0 |
| 8 | Melamine phosphate | 8 | V0 |

TABLE 7

Examples. MEPAL in combination with nitrogen-containing synergists in ABS.

| MEPAL [%] | Synergist | Amount of synergist [%] | Class according to UL 94 (1.5 mm) | LOI [%] |
|---|---|---|---|---|
| 15 | Benzoguanamine | 15 | V2 | 33.5 |
| 15 | Glycoluril | 15 | V2 | 37.0 |
| 15 | Urea cyanurate | 15 | V2 | 39.0 |
| 15 | Melamine cyanurate | 15 | V1 | 36.5 |

TABLE 8

Examples. MEPAL in combination with nitrogen-containing synergists in PP.

| MEPAL [%] | Synergist | Amount of synergist [%] | Class according to UL 94 (1.5 mm) |
|---|---|---|---|
| 20 | Benzoguanamine | 10 | V2 |
| 20 | Glycoluril | 10 | V2 |
| 20 | Melamine cyanurate | 10 | V2 |

From the examples it is evident that nitrogen-containing compounds in the novel combination with alkali metal salts of phosphinic acids exhibit a very good flame-retarding effect. The amount of phosphinic salts, based on the finished polymer compound, necessary to achieve a V0 or V1 or V2 classification can be markedly reduced in the synergistic combination.

What is claimed is:

1. A synergistic flame retardant combination for polymers, which comprises as component A a phosphinic salt of the formula (I) and/or a diphosphinic salt of the formula (II) and/or polymers thereof,

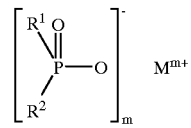

(I)

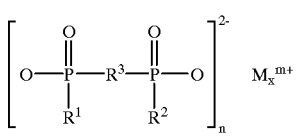

(II)

in which
R$^1$, R$^2$ are C$_1$–C$_6$-alkyl and are linear or branched,
R$^3$ is C$_1$–C$_{10}$-alkylene and is linear or branched, C$_6$–C$_{10}$-arylene, -alkylarylene, or -arylalkylene;
M is calcium ions, aluminum ions, or zinc ions;
m is 2 or 3;
n is 1 or 3;
x is 1 or 2 and as component B a nitrogen compound selected from the formulae (III) to (VII), and mixtures thereof

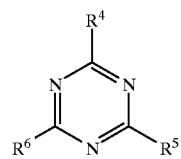

(III)

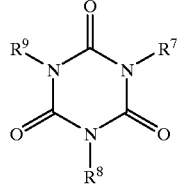

(IV)

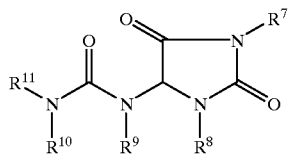

(V)

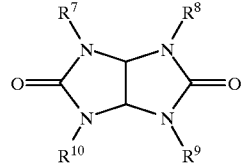

(VI)

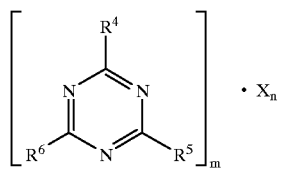

(VII)

in which
R$^4$ to R$^6$ are hydrogen, C$_1$–C$_8$-alkyl, C$_5$–C$_{16}$-cycloalkyl or -alkylcycloalkyl, and wherein each is possibly substituted by a hydroxyl or a $C_1$–$C_4$-hydroxyalkyl function, $C_2$–$C_8$-alkenyl, $C_1$–$C_8$-alkoxy, -acyl, -acyloxy, $C_6$–$C_{12}$-aryl and also —O— $R^4$ and —N($R^4$) $R^5$ or N-alicyclic or N-aromatic, with the proviso that $R^4$ to $R^6$ are not simultaneously hydrogen, $R^7$ to $R^{11}$ are the same groups as $R^4$ to $R^6$, with the exception of substituents —N($R^4$)$R^5$, N-alicyclic and N-aromatic, m is 1,2,3, or 4, n is 1,2,3, or 4, X is one or more acids that can make adducts with triazine compounds.

2. A flame retardant combination as claimed in claim 1, wherein M is aluminum ions.

3. The flame retardant combination as claimed in claim 1, wherein component B is benzoguanamine, terephthalic ester of tris(hydroxyethyl) isocyanurate, allantoin, glycoluril, melamine cyanurate, melamine phosphate, dimelamine phosphate, melamine pyrophosphate or urea cyanurate.

4. The flame retardant combination as claimed in claim 1, wherein $R^1$ and $R^2$ are $C_1$–$C_4$-alkyl.

5. A flameproof polymer molding compound comprising a synergistic flame retardant combination wherein the combination comprises as component A a phosphinic salt of the formula (I) and/or a diphosphinic salt of the formula (II) and/or polymers thereof,

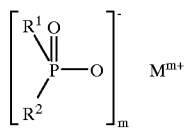

(I)

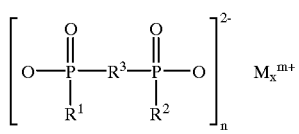

(II)

in which $R^1$, $R^2$ are $C_1$–$C_6$-alkyl and are linear or branched, $R^3$ is $C_1$–$C_{10}$-alkylene and is linear or branched, $C_6$–$C_{10}$-arylene, -alkylarylene, or -arylalkylene;

M is calcium ions, aluminum ions, or zinc ions;

m is 2 or 3;

n is 1 or 3;

x is 1 or 2 and as component B a nitrogen compound selected from the formulae (III) to (VII), and mixtures thereof

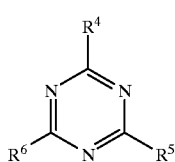

(III)

-continued

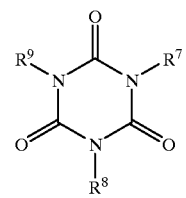

(IV)

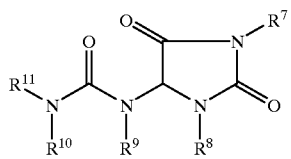

(V)

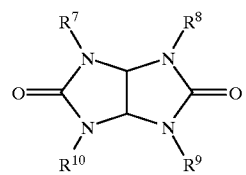

(VI)

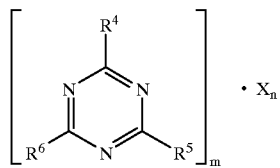

(VII)

in which $R^4$ to $R^6$ are hydrogen, $C_1$–$C_8$-alkyl, $C_5$–$C_{16}$-cycloalkyl or -alkylcycloalkyl, and wherein each is possibly substituted by a hydroxyl or a $C_1$–$C_4$-hydroxyalkyl function, $C_2$–$C_8$-alkenyl, $C_1$–$C_8$-alkoxy, -acyl, -acyloxy, $C_6$–$C_{12}$-aryl and also —O— $R^4$ and —N($R^4$) $R^5$ or N-alicyclic or N-aromatic, with the proviso that $R^4$ to $R^6$ are not simultaneously hydrogen, $R^7$ to $R^{11}$ are the same groups as $R^4$ to $R^6$, with the exception of substituents —N($R^4$)$R^5$, N-alicyclic and N-aromatic, m is 1,2,3, or 4, n is 1,2,3, or 4, X is one or more acids that can make adducts with triazine compounds.

6. The flameproof polymer molding compound as claimed in claim 5, wherein the polymer is an engineering plastic selected from the group consisting of polystyrene-high impact, polyphenylene ethers, polyamides, polyesters, polycarbonates and blends or polyblends of the type acrylonitrile-butadiene-styrene or polycarbonate/acrylonitrile-butadiene-styrene.

7. The flameproof polymer molding compound as claimed in claim 5, wherein the polymer is polystyrene.

8. A method of using a synergistic flame retardant combination for polymers wherein the combination comprises as component A a phosphinic salt of the formula (I) and/or a diphosphinic salt of the formula (II) and/or polymers thereof,

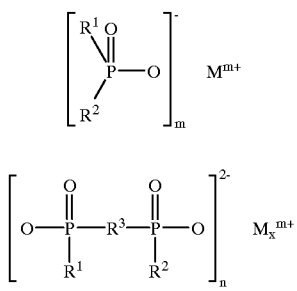

(I)

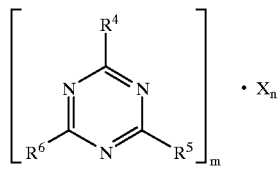

(VII)

(II)

in which

R$^1$, R$^2$ are C$_1$–C$_6$-alkyl and are linear or branched,

R$^3$ is C$_1$–C$_{10}$-alkylene and is linear or branched, C$_6$–C$_{10}$-arylene, -alkylarylene, or -arylalkylene;

M is calcium ions, aluminum ions, or zinc ions;

m is 2 or 3;

n is 1 or 3;

x is 1 or 2 and as component B a nitrogen compound selected from the formulae (III) to (VII), and mixtures thereof

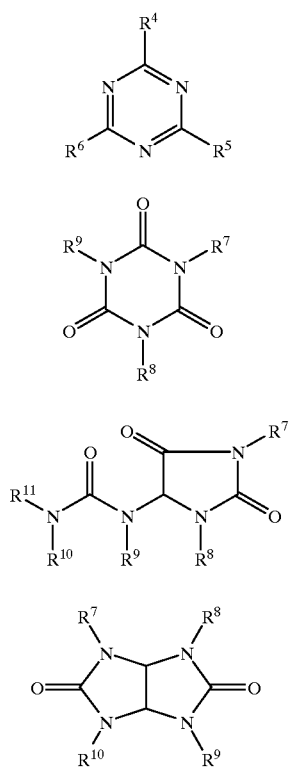

in which

R$^4$ to R$^6$ are hydrogen, C$_1$–C$_8$-alkyl, C$_5$–C$_6$-cycloalkyl or -alkylcycloalkyl, and wherein each is possibly substituted by a hydroxyl or a C$_1$–C$_4$-hydroxyalkyl function, C$_2$–C$_8$-alkenyl, C$_1$–C$_8$-alkoxy, -acyl, -acyloxy, C$_6$–C$_{12}$-aryl and also —O— R$^4$ and —N(R$^4$)R$^5$ or N-alicyclic or N-aromatic, with the proviso that R$^4$ to R$^6$ are not simultaneously hydrogen, R$^7$ to R$^{11}$ are the same groups as R$^4$ to R$^6$, with the exception of substituents —N(R$^4$)R$^5$, N-alicyclic and N-aromatic, m is 1,2,3, or 4, n is 1,2,3, or 4, X is one or more acids that can make adducts with triazine compounds;

the method comprising incorporating the combination in a thermoplastic polymer to flameproof the polymer.

9. The method of using the flame retardant combination as claimed in claim 8 for flameproofing engineering plastics selected from the group consisting of polystyrene-high impact, polyphenylene ethers, polyamides, polyesters, polycarbonates and blends or polyblends of the type acrylonitrile-butadiene-styrene or polycarbonate/ acrylonitrile-butadiene-stlrene.

10. The method of using the flame retardant combination as claimed in claim 8 wherein the polymer is a polyester.

11. The method of using the flame retardant combination as claimed in claim 8, wherein component A and B are employed independently of one another each in a concentration of from 1 to 30% by weight, based on the finished polymer compound.

12. The method of using the flame retardant combination as claimed in claim 8, wherein component A and B are employed independently of one another each in a concentration of from 3 to 20% by weight, based on the finished polymer compound.

13. The method of using the flame retardant combination as claimed in claim 8, wherein component A and B are employed independently of one another each in a concentration of from 5 to 15% by weight, based on the finished polymer compound.

* * * * *